United States Patent
Vajravel et al.

(10) Patent No.: US 12,292,846 B2
(45) Date of Patent: May 6, 2025

(54) MANAGING A WORKSPACE MESH

(71) Applicant: Dell Products L.P., Round Rock, TX (US)

(72) Inventors: Gokul Thiruchengode Vajravel, Bangalore (IN); Vivekanandh Narayanasamy Rajagopalan, Bangalore (IN); Vivek Viswanathan Iyer, St Johns, FL (US)

(73) Assignee: Dell Products L.P., Round Rock, TX (US)

( * ) Notice: Subject to any disclaimer, the term of this patent is extended or adjusted under 35 U.S.C. 154(b) by 282 days.

(21) Appl. No.: 18/164,735

(22) Filed: Feb. 6, 2023

(65) Prior Publication Data
US 2024/0264960 A1   Aug. 8, 2024

(51) Int. Cl.
G06F 13/362    (2006.01)
G06F 9/445     (2018.01)

(52) U.S. Cl.
CPC ........ G06F 13/362 (2013.01); G06F 9/44505 (2013.01)

(58) Field of Classification Search
CPC .......................... G06F 13/362; G06F 9/44505
See application file for complete search history.

(56) References Cited

U.S. PATENT DOCUMENTS

| | | | | |
|---|---|---|---|---|
| 2008/0250408 A1* | 10/2008 | Tsui | ......................... | H02J 7/32 718/100 |
| 2012/0023265 A1* | 1/2012 | Liao | ..................... | G06F 13/387 710/5 |
| 2014/0362734 A1* | 12/2014 | Winkler-Teufel | ......................... | G06F 9/44505 370/254 |
| 2016/0094398 A1* | 3/2016 | Choudhury | ............. | H04L 45/42 370/254 |
| 2022/0038519 A1* | 2/2022 | Yu | ........................ | H04L 65/1073 |
| 2022/0150154 A1* | 5/2022 | Pethe | .................. | H04L 41/0823 |
| 2023/0239326 A1* | 7/2023 | Zhang | ..................... | H04L 63/20 726/1 |

* cited by examiner

Primary Examiner — Phong H Dang
(74) Attorney, Agent, or Firm — Kirton McConkie; Brian Tucker

(57) ABSTRACT

A workspace mesh can be managed. A mesh manager can interface with agents on smart devices to create and update nodes that may form part of a workspace mesh. The mesh manager can also automatically detect when multiple nodes have formed a workspace mesh and then dynamically select and apply mesh policies to the smart devices and peripherals in the workspace mesh. In this way, the workspace mesh can be managed as a single logical unit.

20 Claims, 7 Drawing Sheets

MANAGING A WORKSPACE MESH

CROSS-REFERENCE TO RELATED APPLICATIONS

N/A

BACKGROUND

A user may oftentimes use his or her user computing device in a workspace. In this context, a workspace can be viewed as an environment that includes a user computing device (e.g., a laptop) and peripherals that are connected to the user computing device. Such peripherals may commonly include external displays, a keyboard, a mouse, a webcam, a printer, a speaker, a fingerprint scanner, etc. Oftentimes, a workspace may include a wired or wireless dock by which the user computing device connects to some or all the peripherals.

A workspace may oftentimes be used for hybrid work scenarios. For example, a business may have an office space that includes hoteling cubes that can be assigned to, reserved by, or otherwise utilized by the business's employees as workspaces. In such cases, the business may allow its employees to connect their laptops to a dock in a particular hoteling cube where various peripherals may be available for use. Users may also employ workspaces when working from home.

In some instances, a workspace may include more than one smart device. In the context of this description and the claims, the term "smart device" shall mean a computing device having an operating system and networking stack that allow an agent executing on the computing device to communicate with an on-premises or cloud-based service. User computing devices (e.g., laptops and desktops) are therefore smart devices. Some docks, projectors, displays, keyboards, etc. may also be smart devices.

Existing management solutions allow devices, including smart devices, to be managed. However, when multiple smart devices are part of the same workspace, the existing management solutions will allow management of the smart devices only on an individual and independent basis even though the same user is using the smart devices.

BRIEF SUMMARY

The present invention extends to systems, methods, and computer program products for managing a workspace mesh. A mesh manager can interface with agents on smart devices to create and update nodes that may form part of a workspace mesh. The mesh manager can also automatically detect when multiple nodes have formed a workspace mesh and then dynamically select and apply mesh policies to the smart devices and peripherals in the workspace mesh. In this way, the workspace mesh can be managed as a single logical unit.

In some embodiments, the present invention may be implemented by a mesh manager as a method for managing a workspace mesh. The mesh manager can detect that a workspace mesh has been formed between a first node and a second node. The mesh manager can identify a workspace policy that is applicable to the workspace mesh. The mesh manager can then interface with an agent in the first node and an agent in the second node to apply the workspace policy to the workspace mesh.

In some embodiments, the present invention may be implemented as computer storage media storing computer executable instructions which when executed implement a method for managing a workspace mesh. A mesh manager can receive, from a first agent on a first smart device, information about one or more peripherals connected to the first smart device. The mesh manager can define a first node to represent the first smart device and the one or more peripherals connected to the first smart device. The mesh manager can receive, from a second agent on a second smart device, information about one or more peripherals connected to the second smart device. The mesh manager can define a second node to represent the second smart device and the one or more peripherals connected to the second smart device. The mesh manager can detect that the first smart device is connected to the second smart device. The mesh manager can define a workspace mesh that includes the first node and the second node. A mesh policy can then be applied to the workspace mesh.

In some embodiments, the present invention may be implemented as a method for managing a workspace mesh. A mesh manager can maintain, in a database, nodes defining smart devices and any peripherals connected to the smart devices. The mesh manager can detect that a first smart device is connected to a second smart device. The mesh manager can identify, from among the nodes in the database, a first node representing the first smart device and a second node representing the second smart device. The mesh manager can create a workspace mesh that includes the first and second nodes.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "user computing device" should be construed as encompassing any computing device that a user uses in a workspace. A user computing device may oftentimes be a laptop but could also be a desktop, a tablet, a smart phone, etc. The term "workspace mesh" should be construed as a logical representation of a workspace that includes one or more smart devices such as a user computing device and a smart dock.

Figure 1:
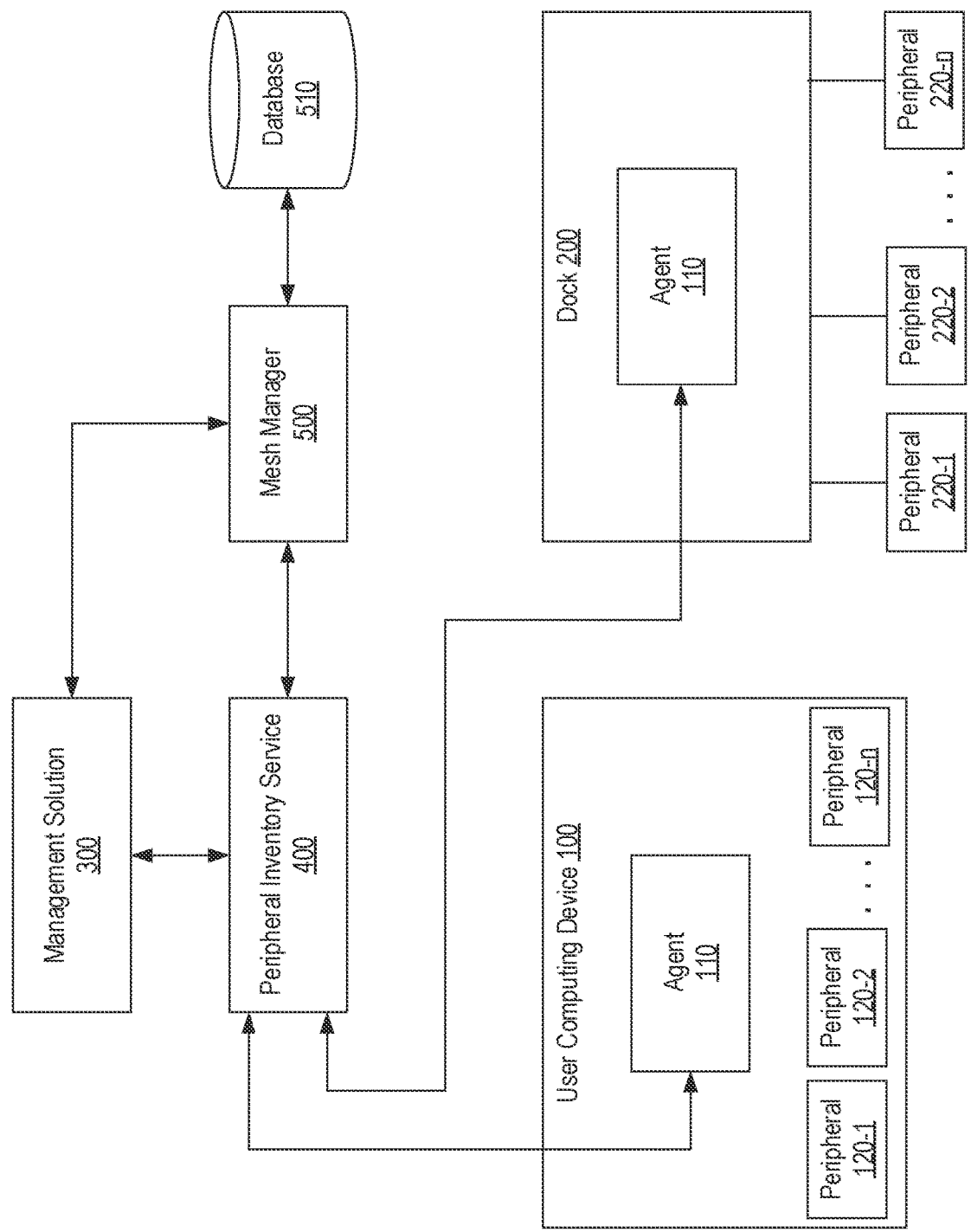
FIG. 1 provides an example of a computing environment in which embodiments of the present invention may be implemented.

FIG. 1 provides an example of a computing environment in which embodiments of the present invention may be implemented. This computing environment includes a workspace formed by a user computing device 100 having one or more peripherals 120-1 through 120-n (generally and collectively peripheral(s) 120), a dock 200, which is a smart device, and one or more peripherals 220-1 through 220-n (generally and collectively peripheral(s) 220) that are connected to dock 200. The computing environment may typically include multiple such workspaces (e.g., a hoteling environment having multiple smart docks, smart projectors, or other smart devices to which users may connect their laptops).

The computing environment also includes a management solution 300 which may typically be hosted in the cloud or otherwise on a server. Management solution 300 can represent any suitable solution for managing user computing device(s) 100, dock(s) 200, and/or other smart devices. For example, management solution 300 could represent Microsoft In Tune, VMware Workspace ONE, etc. Although not shown, a booking service such as AppSpace, Condeco, etc. could be used to book workspaces in the computing environment.

In accordance with embodiments of the present invention, the computing environment may also include a peripheral inventory service 400, a mesh manager 500, and an instance of agent 110 on each smart device. Peripheral inventory service 400 and mesh manager 500 may be hosted on-premises, in the cloud, or in a manner that is otherwise accessible to agent 110 via network communications.

Peripheral inventory service 400 can function primarily to determine which peripherals are connected to each smart device in a workspace. For example, peripheral inventory service 400 can interface with agent 110 on user computing device 100 to determine that peripherals 120 are connected to user computing device 100 and can interface with agent 110 on dock 200 to determine that peripherals 220 are connected to dock 200. Agent 110 can be configured to interface with the operating system on the respective smart device to detect when a peripheral is connected to or disconnected from the smart device and can report such connections or disconnections to peripheral inventory service 400. Peripheral inventory service 400 may also function as an interface that enables management solution 300 to perform its functionality described herein including to deploy policies to any devices in a workspace (e.g., policies applicable to user computing device(s) 100, dock(s) 200, peripherals 120 and 220, etc.).

Mesh manager 500 can function alongside peripheral inventory service 400 to enable a workspace mesh to be managed in accordance with embodiments of the present invention. As an overview, mesh manager 500 can interface with peripheral inventory service 400 to identify when workspace meshes are created and to dynamically apply policies to such workspace meshes. Mesh manager 500 may maintain a database 510 in which it may store information for this purpose.

Figure 2A:
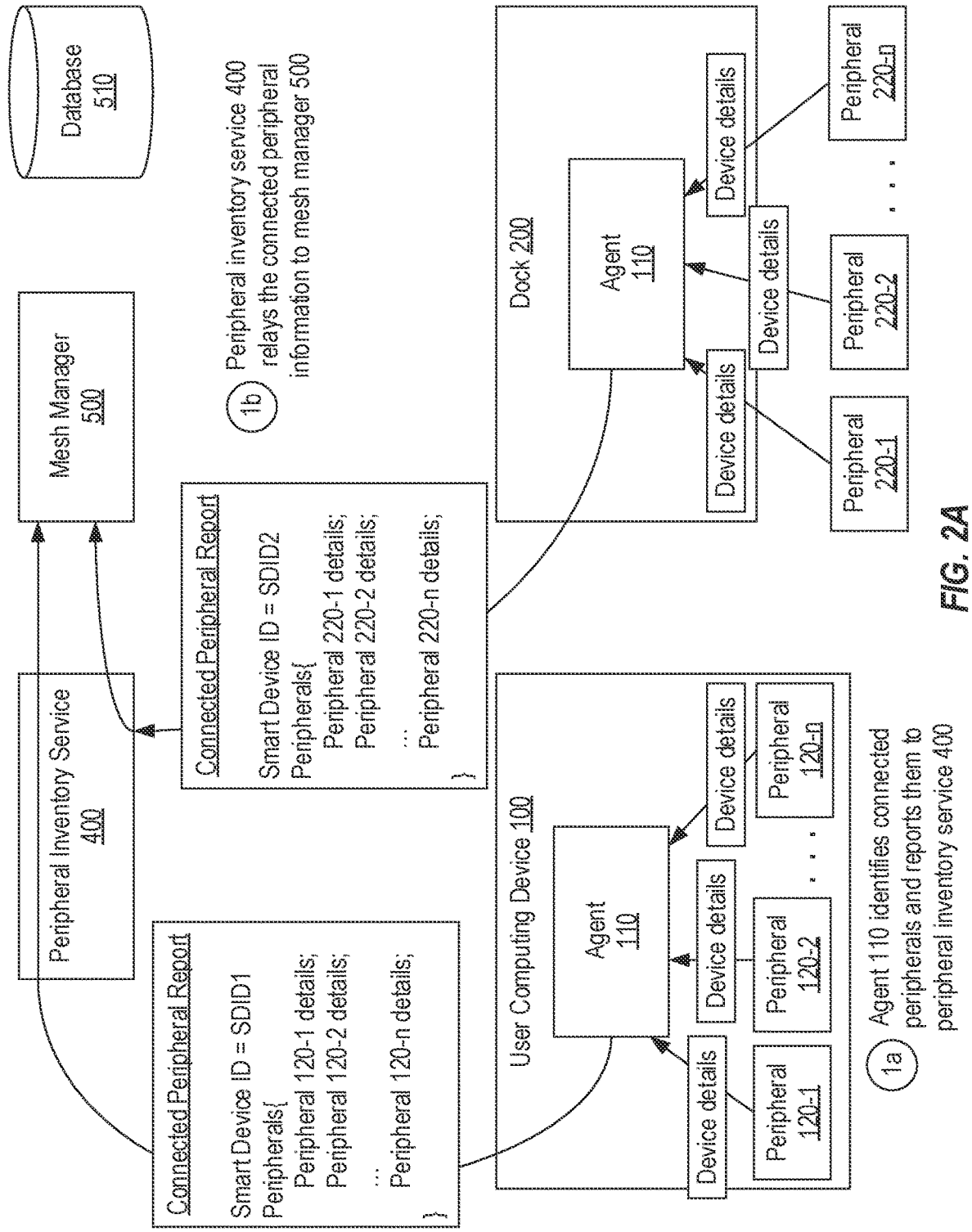
FIGS. 2A and 2B provide an example of how a mesh manager can create and update nodes that may form part of a workspace mesh.
Figure 2B:
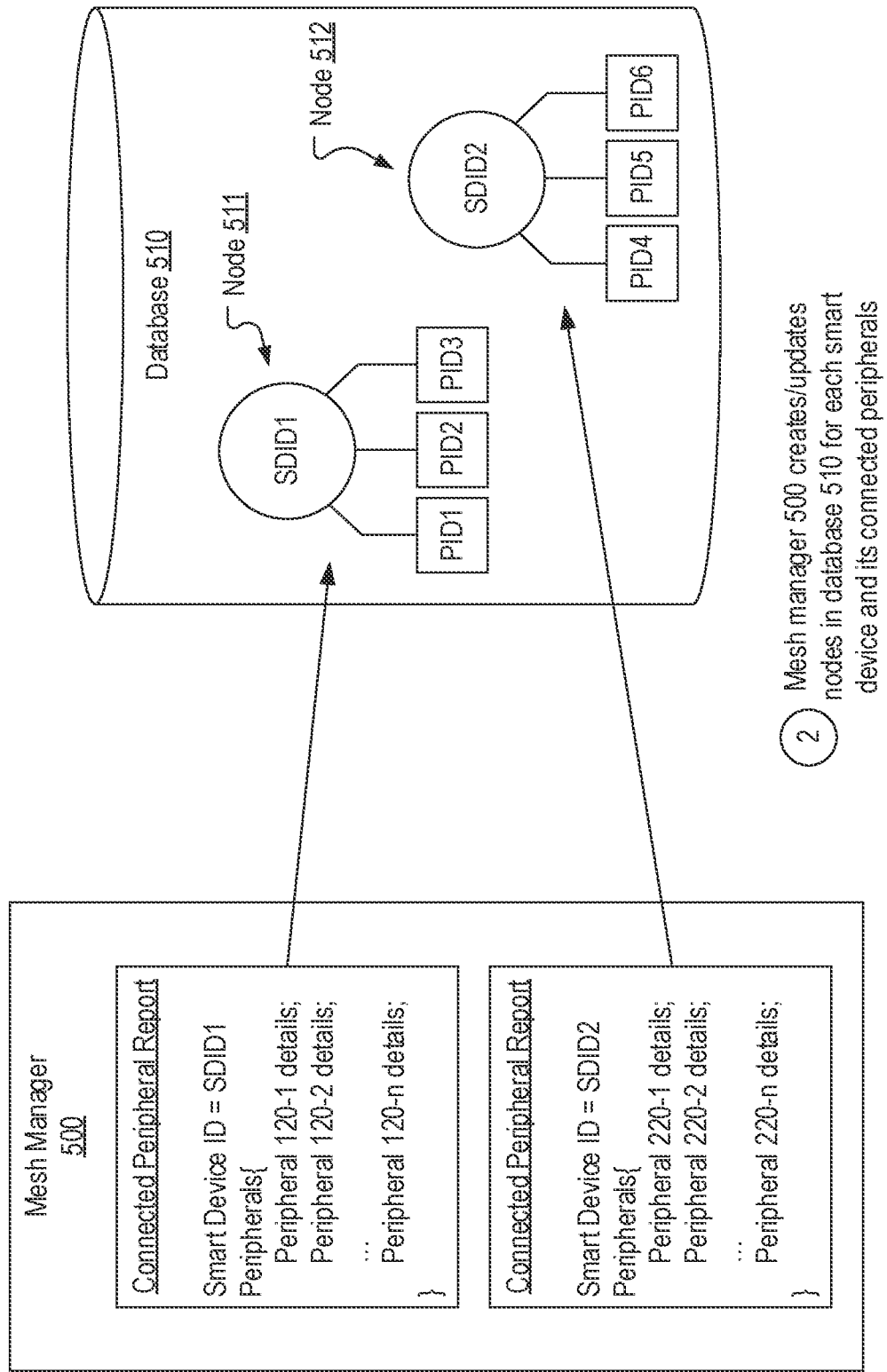

FIGS. 2A and 2B provide an example of how mesh manager 500 may create and update nodes to represent smart devices and their connected peripherals. Mesh manager 500 may use these nodes to manage workspace meshes as will be described in detail below.

Turning to FIG. 2A, in step 1a, agent 110 on each smart device can be configured to identify connected peripherals and to report details about the connected peripherals to peripheral inventory service 400. In the depicted example, agent 110 sends a connected peripheral report that includes an identifier of the smart device (SDID1 for user computing device 100 and SDID2 for dock 200) and details about each peripheral that is connected to the smart device. For example, as part of startup on user computing device 100 and dock 200, agent 110 can enumerate each connected peripheral. Agent 110 could also register to be notified whenever a peripheral is connected. Step 1a can therefore represent the identification of a connected peripheral and the reporting of details of the connected peripheral at any time. The peripheral details could include any information for identifying the peripheral and/or its functionality such as a serial number, a device ID, a hardware ID, a compatible ID, etc. Additionally, step 1a depicts the reporting details of connected peripherals but should also represent the reporting of the disconnection of peripherals. FIG. 2A further represents that the report of connected (or disconnected) peripheral(s) can include an identifier of the smart device to which the peripheral is connected (or from which the peripheral is disconnected). In short, step 1a represents that agent 110 can notify peripheral inventory service 400 of which peripherals are currently connected to the respective smart device.

In step 1b, peripheral inventory service 400 may relay the information about the connected (or disconnected) peripheral(s) to mesh manager 500. In some embodiments, as part of step 1b (or whenever the connection or disconnection of a peripheral is reported), peripheral inventory service 400 could store/update the information about the connected peripherals in database 510, whereas in other embodiments, mesh manager 500 may store/update this information in database 510. In any case, the result is that database 510 stores information defining which peripherals are currently connected to each smart device.

It is noted that the functionality represented in FIG. 2A may be performed regardless of whether user computing device 100 is connected to dock 200. For example, in a typical scenario, agent 110 on dock 200 may report details of its connected peripherals before the user connects user computing device 100 to dock 200.

Turning to FIG. 2B, in step 2 and in response to receiving a connected peripheral report, mesh manager 500 may create/update a node representing the respective smart device. For example, in FIG. 2B, mesh manager 500 has created a node 511 for user computing device 100 and has linked each connected peripheral to node 511. Mesh manager 500 could define node 511 in database 510 in any suitable way such as by linking the identifier of user computing device 100, SDID1, to identifiers of each connected peripheral (PID1, PID2, PID3 for peripherals 120-1, 120-2, and 120-n respectively). Although not shown, database 510 may also associate a user identifier of the user of user computing device 100 with the identifier of user computing device 100 (i.e., mesh manager 500 knows which user is using user computing device 100). This user identifier could be defined within node 511 or otherwise associated with node 511. FIG. 2B also shows that mesh manager 500 has created node 512 to represent dock 200 and its connected peripherals. As mesh manager 500 receives reports of connected or disconnected peripherals, it can update nodes 511 and 512 appropriately so that database 510 defines nodes for each managed smart device and their currently connected peripherals. Accordingly, there may be many nodes defined in database 510 at any given time.

Figure 3:
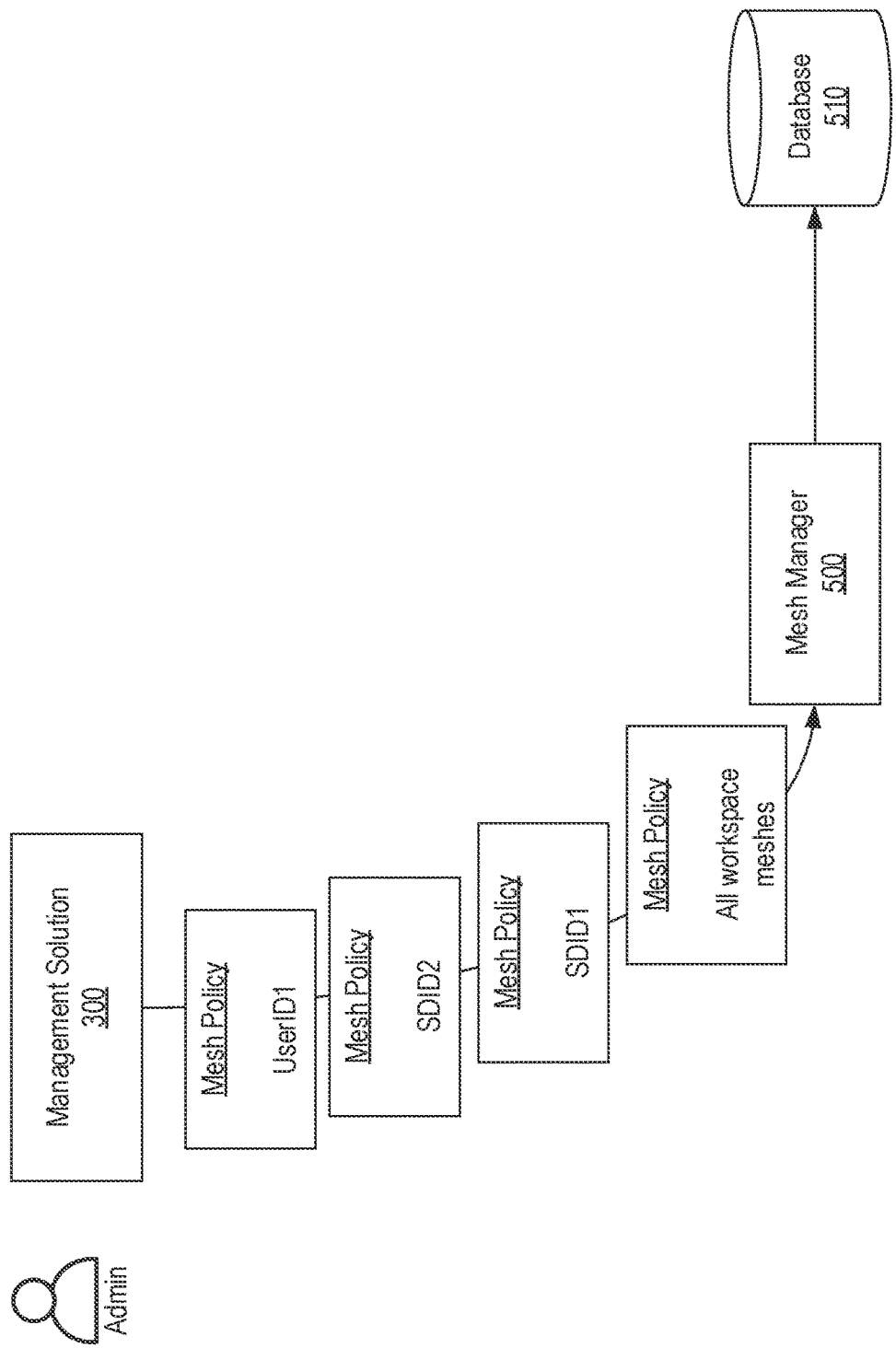
FIG. 3 provides an example of how an administrator may define mesh policies.

FIG. 3 represents how mesh manager 500 allows an administrator to define mesh policies via management solution 300. In this context, a mesh policy should be construed as a collection of configurations, rules, etc. that apply at the workspace mesh level as opposed to being applicable to individual devices. As one example, a mesh policy could define whether a particular smart device is allowed to be part of a workspace mesh that includes another particular smart device. As another example, a mesh policy could define configurations for the devices/peripherals in a workspace mesh that is formed by a particular user or that includes a particular smart device. As a further example, a mesh policy could define how long a workspace mesh can be formed.

As represented in FIG. 3, a mesh policy could be applicable to all workspace meshes that may be formed, to workspace meshes that include a particular smart device (e.g., any workspace mesh that includes user computing device 100 (SDID1) or any workspace that includes dock 200 (SDID2)), to any workspace mesh that a particular user creates (e.g., any workspace mesh formed by the user (UserID1) of user computing device 100), or at any other suitable level of granularity. Mesh manager 500 may store such mesh policies in database 510 so that they may be used when mesh manager 500 detects that a workspace mesh has been formed.

Figure 4A:
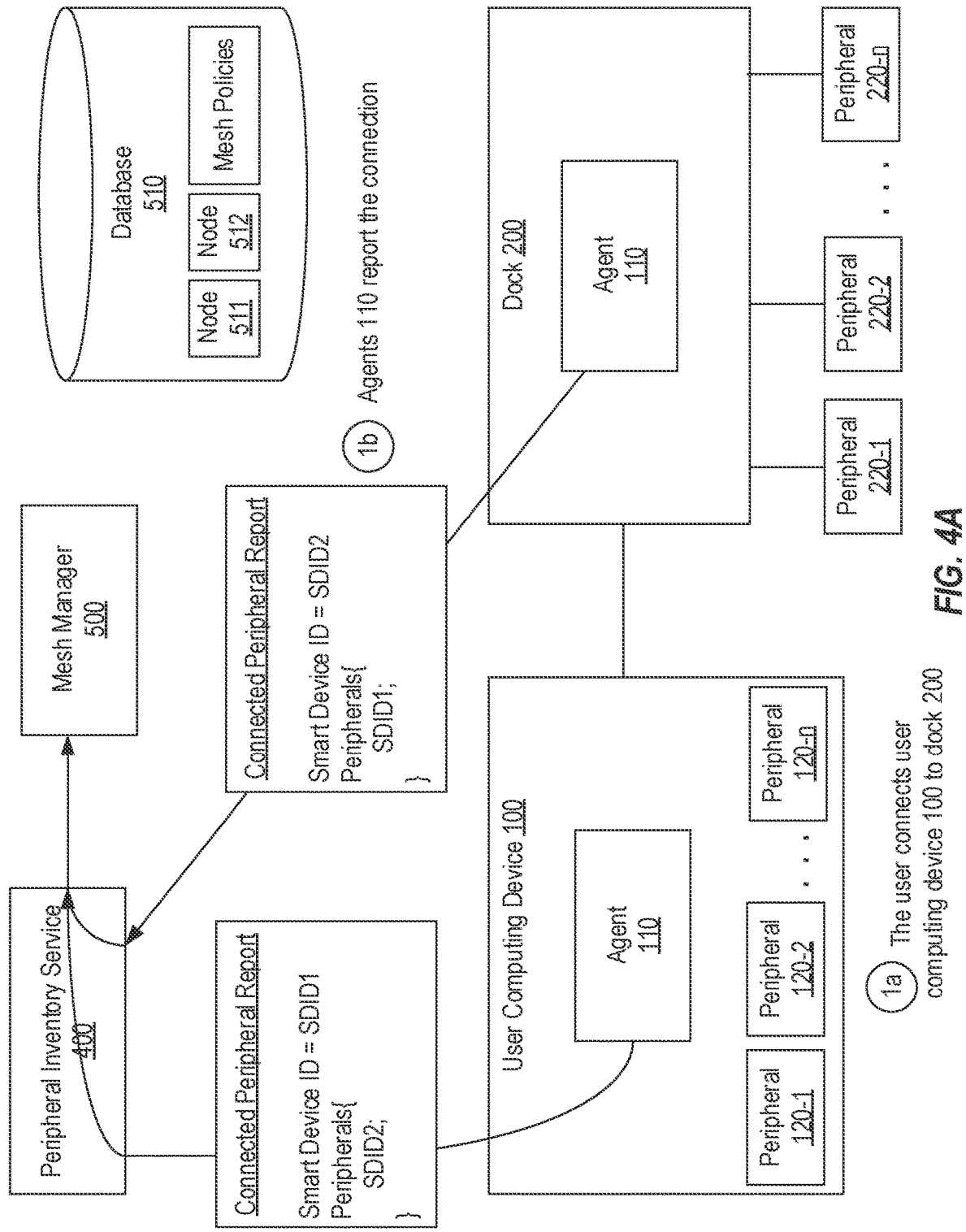
FIGS. 4A-4C provide an example of how a mesh policy can be automatically applied upon detecting that a workspace mesh has been formed.
Figure 4B:
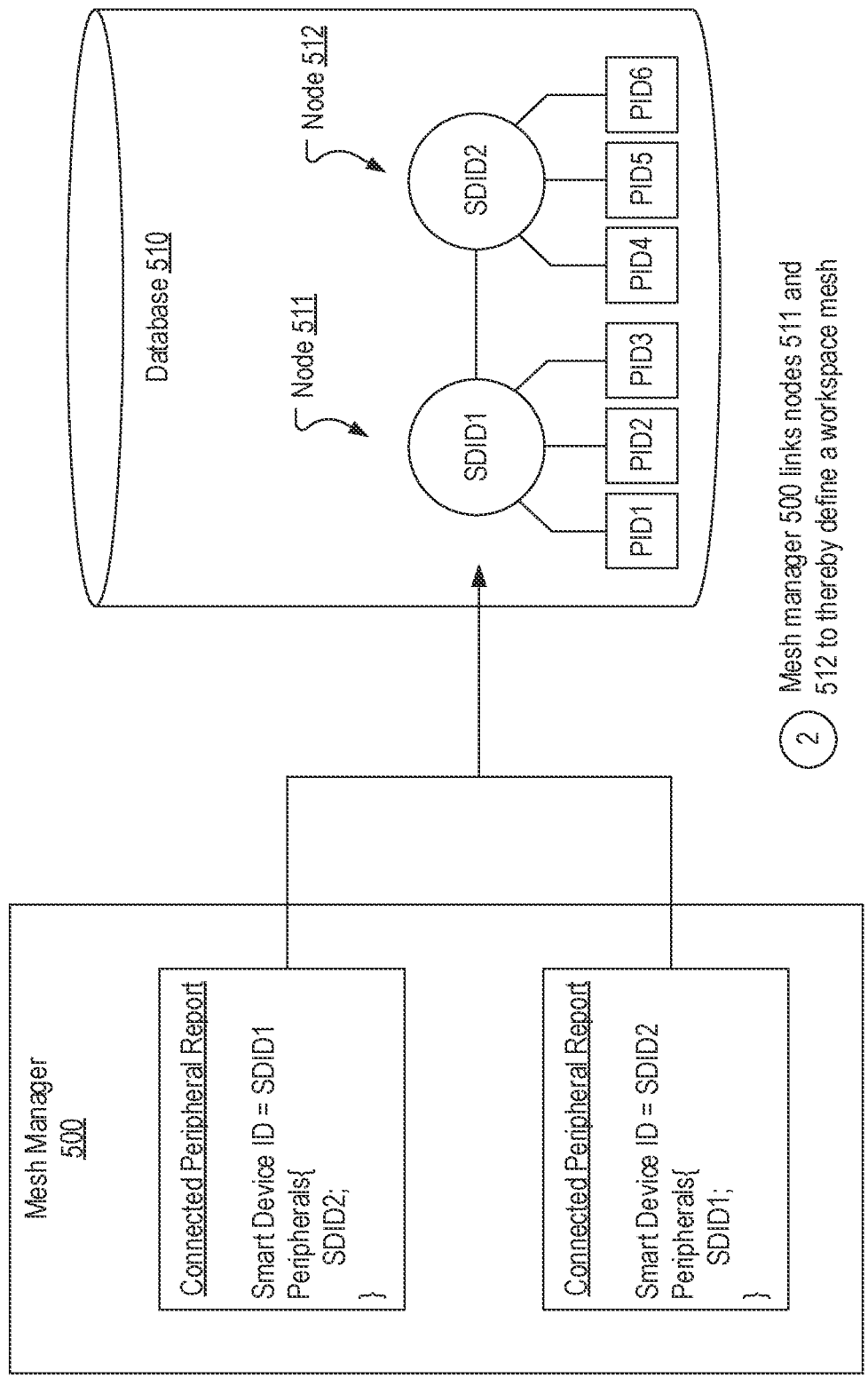
Figure 4C:
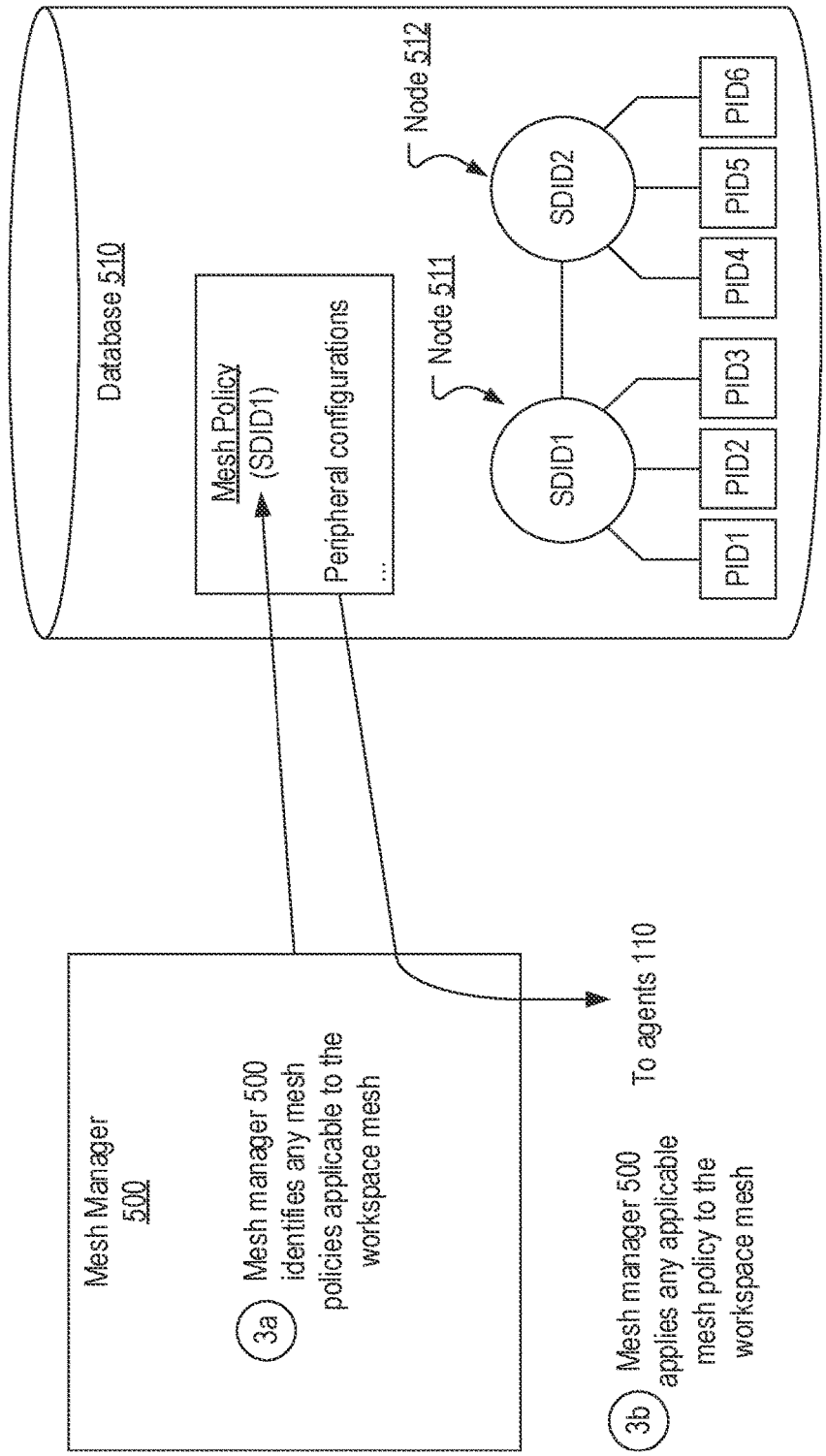

FIGS. 4A-4C provide an example of how mesh manager 500 can apply a mesh policy when it detects that a workspace mesh has been formed. Turning to FIG. 4A, in step 1a, it is assumed that the user connects user computing device 100 to dock 200. In step 1b, agents 110 on user computing device 100 and dock 200 can detect the connection and send connected peripheral reports to peripheral inventory service 400 reporting the connection of dock 200 and user computing device 100 respectively. Peripheral inventory service 400 can relay these reports to mesh manager 500.

Turning to FIG. 4B, in step 2, mesh manager 500 can process either or both the connected peripheral reports to determine that user computing device 100 and dock 200 are connected, and in response can link nodes 511 and node 512 to form a workspace mesh. This linking of nodes 511 and 512 can be performed in any suitable manner such as by associating SDID1 with SDID2. In some embodiments, mesh manager 500 may assign a mesh identifier to the workspace mesh. For example, mesh manager 500 could define a mesh ID of MID1 and associate the mesh ID with SDID1 and SDID2 to thereby define that user computing device 100 and dock 200 are currently connected as part of a workspace mesh.

Turning to FIG. 4C, in step 3a, mesh manager 500 can identify any mesh policies that are applicable to the workspace mesh formed by user computing device 100 and dock 200. For example, mesh manager 500 could identify any mesh policy in database 510 that is associated with the identifier of user computing device 100 (SDID1), the identifier of dock 200 (SDID2), the identifier of the user of user computing device (UserID1), or otherwise applicable. In the depicted example, it is assumed that a mesh policy is associated with SDID1 and defines peripheral configurations. In step 3b, mesh manager 500 can apply any applicable mesh policy to the workspace mesh. In the depicted example, mesh manager 500 can retrieve the peripheral configurations defined in the mesh policy and relay them to agents 110. In particular, mesh manager 500 could determine from node 511 that peripherals 120-1 through 120-n are connected to user computing device 100, obtain configurations applicable to these peripherals from the mesh policy and then send the configurations to agent 110 on user computing device 100. Similarly, mesh manager 500 could determine from node 512 that peripherals 220-1 through 220-n are connected to dock 200, obtain configurations applicable to these peripherals from the mesh policy and then send the configurations to agent 110 on dock 200. Agents 110 could then cause these configurations to be applied to the respective peripherals (e.g., configuring settings of a display device and/or webcam connected to dock 200 in accordance with policy-defined preferences, disabling a peripheral connected to user computing device 100 to cause a similar peripheral connected to dock 200 to be used, blocking access to a peripheral connected to dock 200, disabling USB ports of all smart devices in the workspace mesh, etc.). In this way, peripheral configurations associated with user computing device 100 (SDID1) can be automatically and dynamically applied to all peripherals that may be part of a workspace mesh.

In some embodiments, a mesh policy may define when a workspace mesh should be locked to thereby prevent the connection of additional smart devices. For example, a mesh policy may define that a workspace mesh that includes a particular smart device should have no more than two smart devices. In such a case, if a third smart device is physically connected to one of the two smart devices that have formed a workspace mesh, mesh manager 500 can prevent the third smart device from being functionally connected to the other two smart devices and their respective peripherals (e.g., by instructing agent 110 to use a filter driver to block a USB connection by which the third smart device is physically connected). A similar mesh policy could be used to prevent smart devices from forming workspace meshes with other smart devices. For example, a mesh policy could be defined that allows only certain user computing devices to form workspace meshes with dock 200. If mesh manager 500 detects that a disallowed user computing device is physically connected to dock 200, it can instruct agent 110 on dock 200 to functionally block the user computing device from forming the workspace mesh.

In some embodiments, mesh manager 500 can monitor a workspace mesh to determine when a mesh policy should be applied. For example, a mesh policy could define a time limit for a workspace mesh. If mesh manager 500 determines that a workspace mesh has surpassed the time limit, it can apply the mesh policy by instructing agent 110 to functionally disconnect the smart device (e.g., by preventing a user computing device from remaining functionally connected to a smart display or smart projector after the time limit). A similar mesh policy could be defined to block a smart device from forming or remaining in a workspace mesh if its or its user's trust/security level is below a minimum.

Whenever a smart device is disconnected from a workspace mesh (whether physically disconnected by the user or functionally disconnected by mesh manager 500), agent 110 can report the disconnection in a similar manner as is represented in FIG. 4A and mesh manager 500 can instruct agents 110 to undo any mesh policies that had been applied. For example, if peripherals 120-1 through 120-n were configured in accordance with a mesh policy when user computing device 100 was connected to dock 200, mesh manager 500 can cause such configurations to be reverted upon detecting that the user has disconnected user computing device 100 from dock 200.

In some embodiments, a mesh policy could define how smart devices should be interconnected in a workspace mesh. For example, if a workspace mesh is formed among three smart devices, a dock, a smart monitor, and a user computing device, a mesh policy could define that the smart monitor should be connected directly to the user computing device rather than via the dock. To accomplish this, mesh manager 500 could instruct agent 110 on the smart monitor and/or the user computing device to form a direct wireless connection rather than relying on a wired connection between the user computing device and the dock and between the dock and the smart display. Similarly, a mesh policy could define which interface(s) of multiple available interfaces should be used to functionally connect two smart devices in a workspace mesh. For example, if dock 200 has a USB-C and Wi-Fi interface, user computing device 100 is physically connected to dock 200 via USB-C, and an applicable mesh policy dictates that USB-C should be used, mesh manager 500 can interface with agent(s) 110 to block a Wi-Fi connection between user computing device 100 and dock 200. Alternatively, a mesh policy could dictate that both interfaces should be used, and mesh manager 500 could interface with agent(s) 110 to establish a Wi-Fi connection.

In some embodiments, one of the nodes in a workspace mesh may serve as a primary node for purposes of resolving conflicts in applicable mesh policies. For example, node 512 for dock 200 could be considered the primary node. In such a case, if a mesh policy associated with user computing device 100 conflicts with a mesh policy associated with dock 200, mesh manager 500 could select the mesh policy associated with dock 200.

In some embodiments, mesh manager 500 and agents 110 could be configured to communicate mesh policies via a subscription model. For example, mesh manager 500 could be configured to use Kafka topics to convey mesh policy messages to agents 110 of smart devices in the workspace mesh. In such cases and when a smart device is joined to a workspace mesh, mesh manager 500 can inform agent 110 on the smart device to subscribe to any Kafka topics that are used to convey mesh policy communications.

In summary, embodiments of the present invention may be implemented to facilitate the management of workspace meshes. An administrator can define mesh policies that will be applied to any smart device that may form part of a workspace mesh as well as to any peripherals that are connected to the smart device. In this way, all devices in a workspace mesh can be dynamically managed as a single logical unit.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a mesh manager, for managing a workspace mesh comprising:
    receiving, from a first agent executing on a first smart device, a first connected peripheral report that includes an identifier of the first smart device and details about one or more peripherals that are connected to the first smart device, the details including an identifier for each of the one or more peripherals that are connected to the first smart device;
    in response to receiving the first connected peripheral report, creating a first node in a database, the first node linking the identifier of the first smart device to the identifier of each of the one or more peripherals that are connected to the first smart device;
    receiving, from a second agent executing on a second smart device, a second connected peripheral report that includes an identifier of the second smart device and details about one or more peripherals that are connected to the second smart device, the details including an identifier for each of the one or more peripherals that are connected to the second smart device;
    in response to receiving the second connected peripheral report, creating a second node in the database, the second node linking the identifier of the second smart device to the identifier of each of the one or more peripherals that are connected to the second smart device;
    storing workspace policies in the database, each workspace policy defining configurations applicable to a workspace mesh formed between multiple smart devices, wherein a first workspace policy of the workspace policies defines configurations applicable to a workspace mesh formed between the first node and the second node;
    detecting that the first smart device has been connected to the second smart device to thereby form a workspace mesh between the first node and the second node;

determining that the first workspace policy is applicable to the workspace mesh formed between the first node and the second node; and interfacing with the first agent on the first smart device and the second agent on the second smart device to apply the first workspace policy to the workspace mesh formed between the first node and the second node in response to the first smart device being connected to the second smart device, wherein applying the first workspace policy comprises applying configurations to the first smart device, the one or more peripherals that are connected to the first smart device, the second smart device, and the one or more peripherals that are connected to the second smart device.

2. The method of claim 1, wherein the first smart device is a user computing device and the second smart device is a dock, a projector, or a display.

3. The method of claim 1, wherein determining that the first workspace policy is applicable to the workspace mesh formed between the first node and the second node comprises one of:
   determining that the first workspace policy includes the identifier of the first smart device or the identifier of the second smart device; or
   determining that the first workspace policy includes an identifier of a user of the first smart device.

4. The method of claim 1, further comprising:
   causing the first node to be removed from the workspace mesh based on another workspace policy.

5. The method of claim 4, further comprising:
   causing the first workspace policy to no longer be applied to the workspace mesh after causing the first node to be removed from the workspace mesh.

6. The method of claim 1, further comprising:
   preventing a third node from joining the workspace mesh based on another workspace policy.

7. The method of claim 1, wherein applying the first workspace policy to the workspace mesh comprises establishing one or more interfaces between the first smart device and the second smart device.

8. One or more computer storage media storing computer executable instructions which when executed implement a method for managing a workspace mesh, the method comprising:
   receiving, from a first agent executing on a first smart device, a first connected peripheral report that includes an identifier of the first smart device and details about one or more peripherals that are connected to the first smart device, the details including an identifier for each of the one or more peripherals that are connected to the first smart device;
   in response to receiving the first connected peripheral report, creating a first node in a database, the first node linking the identifier of the first smart device to the identifier of each of the one or more peripherals that are connected to the first smart device;
   receiving, from a second agent executing on a second smart device, a second connected peripheral report that includes an identifier of the second smart device and details about one or more peripherals that are connected to the second smart device, the details including an identifier for each of the one or more peripherals that are connected to the second smart device;
   in response to receiving the second connected peripheral report, creating a second node in the database, the second node linking the identifier of the second smart device to the identifier of each of the one or more peripherals that are connected to the second smart device;
   storing workspace policies in the database, each workspace policy defining configurations applicable to a workspace mesh formed between multiple smart devices, wherein a first workspace policy of the workspace policies defines configurations applicable to a workspace mesh formed between the first node and the second node;
   detecting that the first smart device has been connected to the second smart device to thereby form a workspace mesh between the first node and the second node;
   determining that the first workspace policy is applicable to the workspace mesh formed between the first node and the second node; and
   interfacing with the first agent on the first smart device and the second agent on the second smart device to apply the first workspace policy to the workspace mesh formed between the first node and the second node in response to the first smart device being connected to the second smart device, wherein applying the first workspace policy comprises applying configurations to the first smart device, the one or more peripherals that are connected to the first smart device, the second smart device, and the one or more peripherals that are connected to the second smart device.

9. The computer storage media of claim 8, wherein configuring the one or more peripherals connected to the first smart device or the one or more peripherals connected to the second smart device comprises disabling at least one of the peripherals.

10. The computer storage media of claim 8, wherein applying the first workspace policy to the workspace mesh comprises establishing a connection between the first smart device and the second smart device.

11. The computer storage media of claim 8, wherein applying the first workspace policy to the workspace mesh comprises removing the first smart device and the one or more peripherals connected to the first smart device from the workspace mesh.

12. The computer storage media of claim 8, wherein the method further comprises:
   defining a third node for a third smart device;
   detecting that the third smart device is connected to the first or second smart device; and
   adding the third node to the workspace mesh.

13. The computer storage media of claim 8, wherein the method further comprises:
   selecting the first workspace policy based on the identifier of the first or second smart device.

14. A system comprising:
   a mesh manager executed on one or more processors;
   a first smart device to which one or more peripherals are connected; and
   a second smart device to which one or more peripherals are connected;
   wherein the mesh manager is configured to manage a workspace mesh by performing the following:
      receive, from a first agent executing on the first smart device, a first connected peripheral report that includes an identifier of the first smart device and details about the one or more peripherals that are connected to the first smart device, the details including an identifier for each of the one or more peripherals that are connected to the first smart device;

in response to receiving the first connected peripheral report, creating a first node in a database, the first node linking the identifier of the first smart device to the identifier of each of the one or more peripherals that are connected to the first smart device;

receiving, from a second agent executing on the second smart device, a second connected peripheral report that includes an identifier of the second smart device and details about one or more peripherals that are connected to the second smart device, the details including an identifier for each of the one or more peripherals that are connected to the second smart device;

in response to receiving the second connected peripheral report, creating a second node in the database, the second node linking the identifier of the second smart device to the identifier of each of the one or more peripherals that are connected to the second smart device;

storing workspace policies in the database, each workspace policy defining configurations applicable to a workspace mesh formed between multiple smart devices, wherein a first workspace policy of the workspace policies defines configurations applicable to a workspace mesh formed between the first node and the second node;

detecting that the first smart device has been connected to the second smart device to thereby form a workspace mesh between the first node and the second node;

determining that the first workspace policy is applicable to the workspace mesh formed between the first node and the second node; and interfacing with the first agent on the first smart device and the second agent on the second smart device to apply the first workspace policy to the workspace mesh formed between the first node and the second node in response to the first smart device being connected to the second smart device, wherein applying the first workspace policy comprises applying configurations to the first smart device, the one or more peripherals that are connected to the first smart device, the second smart device, and the one or more peripherals that are connected to the second smart device.

15. The system of claim 14, wherein the first smart device is a user computing device and the second smart device is a dock, a projector, or a display.

16. The system of claim 14, wherein determining that the first workspace policy is applicable to the workspace mesh formed between the first node and the second node comprises one of:
determining that the first workspace policy includes the identifier of the first smart device or the identifier of the second smart device; or
determining that the first workspace policy includes an identifier of a user of the first smart device.

17. The system of claim 14, wherein the mesh manager is further configured to cause the first node to be removed from the workspace mesh based on another workspace policy.

18. The system of claim 17, wherein the mesh manager is further configured to cause the first workspace policy to no longer be applied to the workspace mesh after causing the first node to be removed from the workspace mesh.

19. The system of claim 14, wherein the mesh manager is further configured to prevent a third node from joining the workspace mesh based on another workspace policy.

20. The system of claim 14, wherein applying the first workspace policy to the workspace mesh comprises establishing one or more interfaces between the first smart device and the second smart device.

* * * * *